United States Patent [19]

Devers et al.

[11] 3,928,963
[45] Dec. 30, 1975

[54] CAST IN PLACE GAS TURBINE CONTAINMENT RING AND METHOD OF MANUFACTURE

[75] Inventors: Melvin W. Devers, Bay City; William L. Felske, Saginaw, both of Mich.

[73] Assignee: General Motors Corporation, Detroit, Mich.

[22] Filed: Nov. 4, 1974

[21] Appl. No.: 520,498

[52] U.S. Cl. ............ 60/39.66; 60/39.31; 415/9; 415/178
[51] Int. Cl.² ... F02C 7/12; F01B 25/16; F01D 5/08
[58] Field of Search ......... 60/39.66, 39.31, 39.16 R; 415/9, 178

[56] References Cited
UNITED STATES PATENTS

| | | | |
|---|---|---|---|
| 3,241,813 | 3/1966 | von Flue et al. | 415/9 |
| 3,628,884 | 12/1971 | Mierley | 415/108 X |
| 3,818,696 | 6/1974 | Beaufree | 60/39.66 X |
| 3,849,022 | 11/1974 | Amann et al. | 415/178 X |

Primary Examiner—C. J. Husar
Assistant Examiner—Thomas I. Ross
Attorney, Agent, or Firm—J. C. Evans

[57] ABSTRACT

A cast iron gas turbine engine block has an integrally formed internal wall configuration which defines a centrally located exhaust gas passage through the block and a radially outwardly located cooling air passage for directing cooling gas around the exhaust gas passage, a pair of separate inner walls are spaced apart and each includes a plurality of integrally formed circumferentially arranged posts thereon directed into the passage and having the tip portions thereon formed in situ of side grooves on a steel turbine wheel containment ring; the ring of posts in each of the side wall grooves of the ring locate it radially outwardly of an annular inner wall of the cast iron housing and form air flow openings around the ring to enable the cooling air directed through the cooling air passage to completely surround and circulate around the ring for cooling it during turbine operation.

2 Claims, 7 Drawing Figures

CAST IN PLACE GAS TURBINE CONTAINMENT RING AND METHOD OF MANUFACTURE

The invention also contemplates an improved method for retaining a steel containment ring within a cast iron turbine engine block.

This invention relates to gas turbine engines and more particularly to a cast aluminum housing with a steel containment ring in spaced relationship to a high speed turbine wheel component and a method for its manufacture.

In conventional gas turbine engines of the type having a cast aluminum housing a steel containment ring is placed in the high temperature exhaust section of the block. This requires that the ring be constructed of a high alloy material such as Inconel 601 suitable for use under operating conditions in excess of 1300°F. In such arrangements the engine block must be machined to define a seat for the containment ring and fastening devices such as bolts and screws are required for retaining it in place. Furthermore, in such arrangements plugs and caps are required to seal between the casting and the retainer ring and a pressing operation is required to insert the ring in place in the block.

An object of the present invention is to provide an improved structure for containment of a turbine stage in a gas turbine engine by the provision of a steel ring that is located in an internal air cooling passage of a cast block, radially outwardly of and in circumferential surrounding relationship to an exhaust passage shroud that surrounds a high speed turbine stage of the engine and wherein the ring is retained in place within the cast housing by a plurality of posts formed integrally of the housing to define air cooling passages around the ring while serving to retain it fixedly with respect to the remainder of the casting.

Still another object of the present invention is to provide an improved cast turbine engine housing having a preformed metal containment ring supported in an annular passage in the housing by means of a plurality of retaining posts formed integrally in the cast housing and each directed inwardly of the annular passage into an in situ engagement with grooved walls of the ring so as to define a plurality of air flow passages around the ring and wherein the posts are arranged to support the ring radially outwardly of and in circumferential surrounding relationship to a shroud defining an exhaust passageway through a high speed turbine stage of the engine.

Still another object of the present invention is to provide an improved method for assembling a preformed metal containment ring in a cast turbine block by a method that permits the preformed metal containment ring to be contained in the casting throughout processing of the casting and during field usage and to do so by a method that reduces chill effect during the casting process by placing the steel ring in a core box and forming a core around the ring with a minimum core wall thickness maintained against all surfaces of the ring and core box posts for defining core post cavities and thereafter inserting the partially formed core and containment ring therein into a mold box for the cast housing and pouring molten cast metal to fill post cavities formed in the containment ring core which, upon solidification, define a plurality of inwardly formed cast metal posts that are located in situ of grooves in the containment ring for maintaining it fixedly within an internally formed air cooling passage in the cast turbine block.

Further objects and advantages of the present invention will be apparent from the following description, reference being made to the accompanying drawings wherein a preferred embodiment of the present invention is clearly shown.

Figure 3:
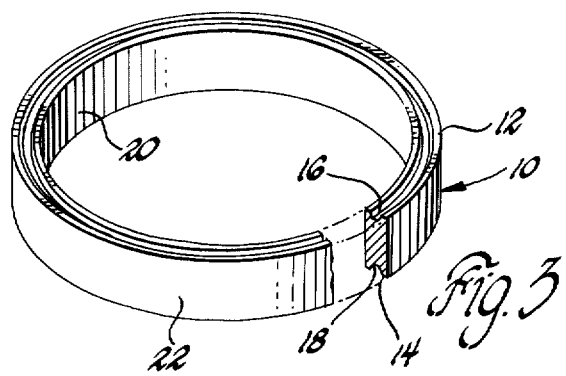
FIG. 3 is a perspective view of a preformed containment ring used in the present invention.
Figure 4:
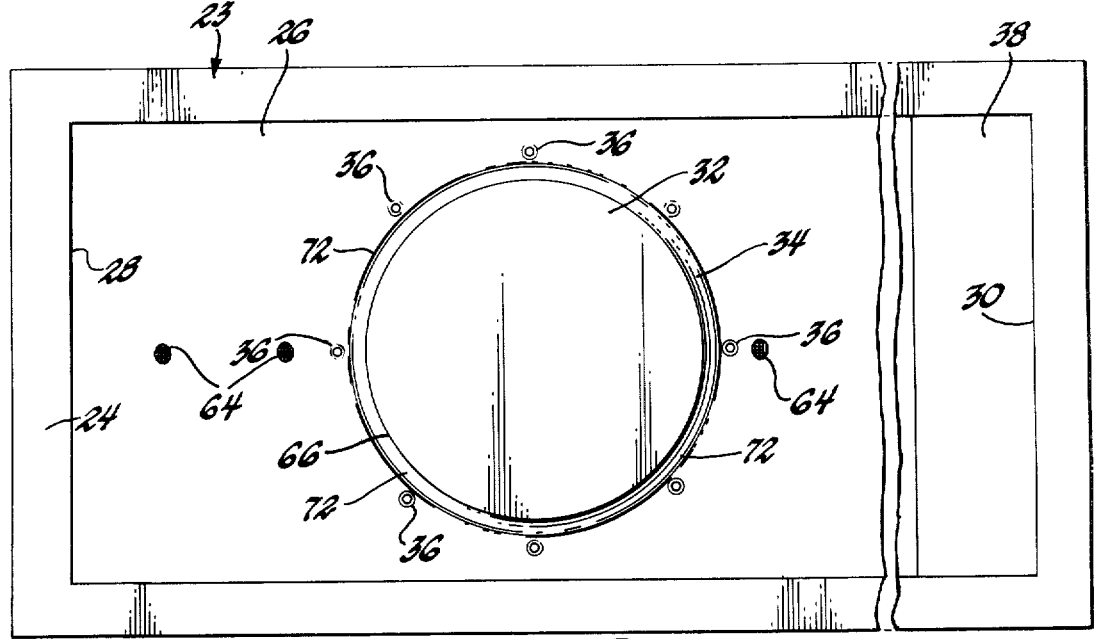
FIG. 4 is a top elevational view of the bottom of a core box showing post formations thereon.
Figure 5:
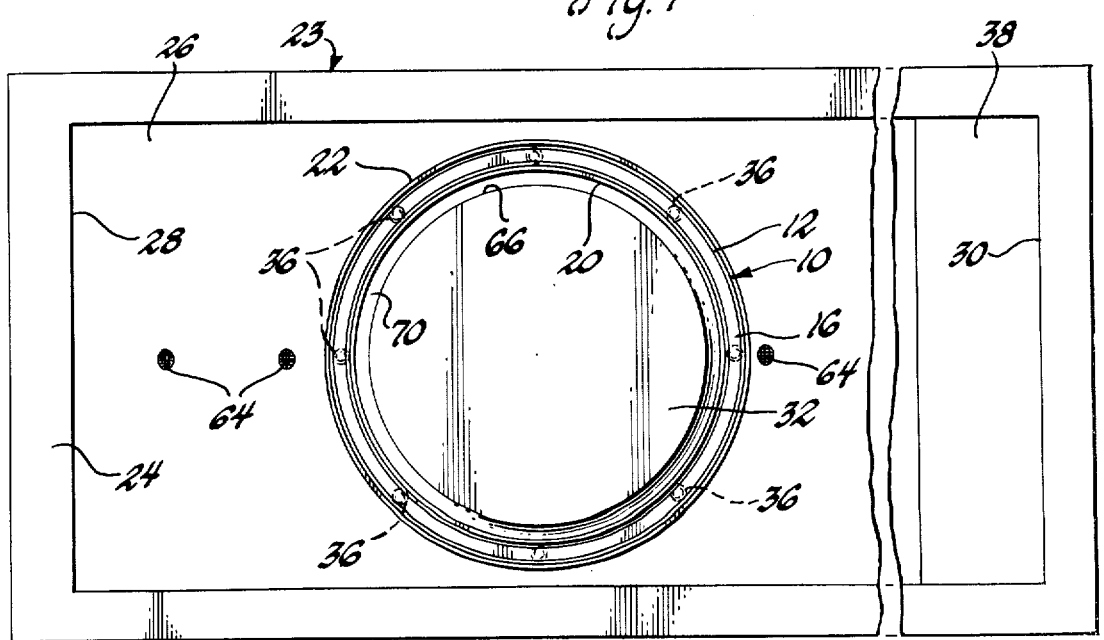
FIG. 5 is a top elevational view of the core box bottom of FIG. 4 with the preformed containment ring in place therein.

Referring now to FIGS. 3 through 7, the present invention contemplates an improved method of manufacture for locating a containment ring in a cast turbine block. More particularly the method includes the prefabrication of a metal containment ring 10 that includes a pair of side walls 12, 14 each having a groove 16, 18 respectively, formed continuously circumferentially around as best seen in FIG. 3. The inside diameter 20 of the ring 10 and the outside diameter 22 define a ring especially suited for use in the present invention.

The method includes locating a ring such as that illustrated at FIG. 3 in a mold box base 23 having a peripheral flange 24 formed therearound defining the boundaries of a bottom surface 26 that is depressed from side edges 28, 30 of the box in the direction of a centrally located core box reference surface 32 of circular cross section. The downwardly depressed bottom surface 26 is separated from the circular cross sectioned reference surface 32 by an annular depression 34 formed continuously circumferentially around the reference surface 32.

The core box base 23 further includes a plurality of circumferentially spaced upstanding posts 36 that are formed integrally of surface 26 in a ring pattern radially outwardly of and around the groove 34. The core box base 23 further includes a flat surface 38 on one side thereof as best seen in FIG. 6.

Additionally, the core box includes a cover 40 having a centrally located reference surface 42 thereon that is of circular cross section and congruous with the reference surface 32. It includes an annular semicircular shaped surface 44 thereon that overlies depression 34 in the core box base 23. The surface 44 has a plurality of circumferentially spaced depending posts 46 thereon each aligned axially with one of the posts 36 when the reference surface 42 is indexed against the reference surface 32. The core box cover 40 further includes a peripheral flange 48 thereon that is supportingly received by the flange 24 on the core box base 23.

Figure 6:
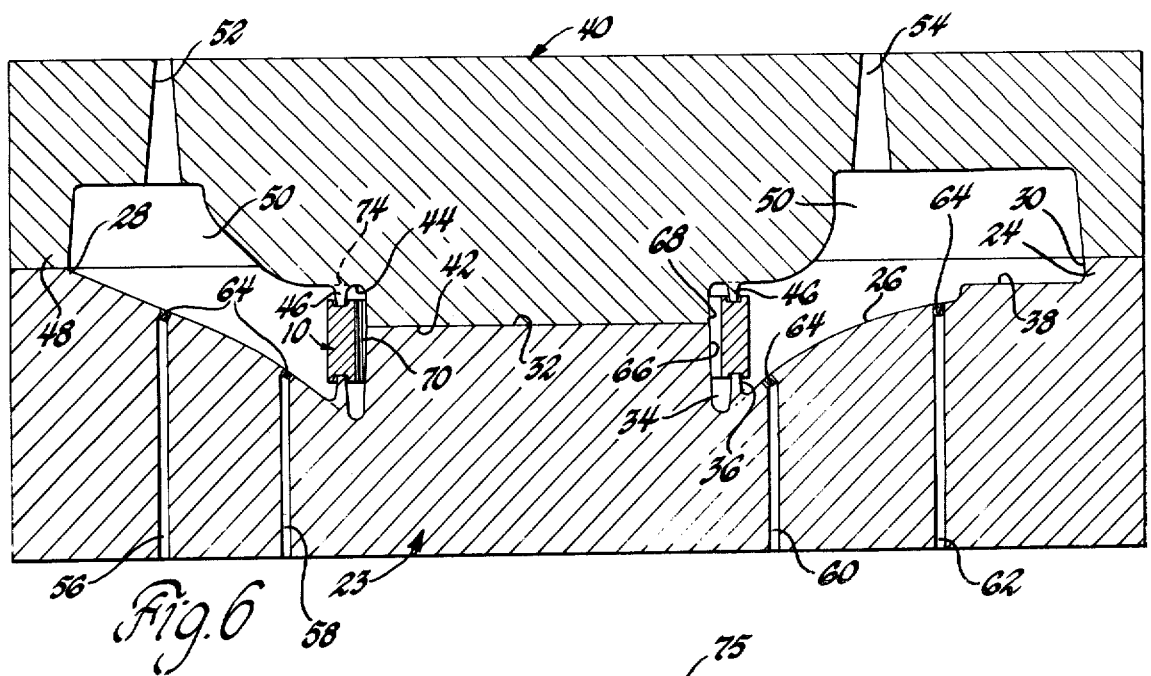
FIG. 6 is a vertical sectional view of the core box of the present invention with the preformed containment ring in place therein.

As best seen in FIG. 6, the core box base 23 and cover 40 cooperate to define an annular core box cavity 50. The box cover 40 includes blow tubes 52, 54 each in communication with cavity 50 and the core box base 23 includes a plurality of vent holes 56, 58, 60, 62 each covered with a screen 64.

The process includes placing the groove 18 of the steel ring 10 in place on the posts 36 in the core box base 23. The groove 18 and posts 36 define a three point location of the ring in the base 23 of the core box so that it will be properly centered within the cavity 50.

The cover 40 of the core box along with the opposing posts 46 thereon are placed in position in groove 16 of ring 10 to further level and center the ring 10 within the cavity 50 as is best seen in FIG. 6. With reference surfaces 32, 42 mated the outer peripheries 66, 68 of surfaces 32, 42 are spaced radially inwardly of ring 10. This defines an annular opening 70 between the inside diameter 20 of ring 10 and peripheries 66, 68. Access to opening 70 is through gaps 72 between adjacent ones of posts 36 and gaps 74 between posts 46. Sand is then blown into the core box cavity 50 through the tubes 52, 54 and is directed around the ring across the spaced posts 36, 46 to form a core 75 having the configuration illustrated in FIG. 7.

One characteristic of the method is that a minimum sand thickness, in one working embodiment ⅜ inch, is maintained against all surfaces of the ring 10 but for grooves 16, 18 for thermal insulation of the ring during casting thereby to minimize chill of the molten metal that forms a part of a cast turbine housing in association with the ring, and furthermore to promote ease of cleaning of a casting in which the core is inserted.

Figure 7:
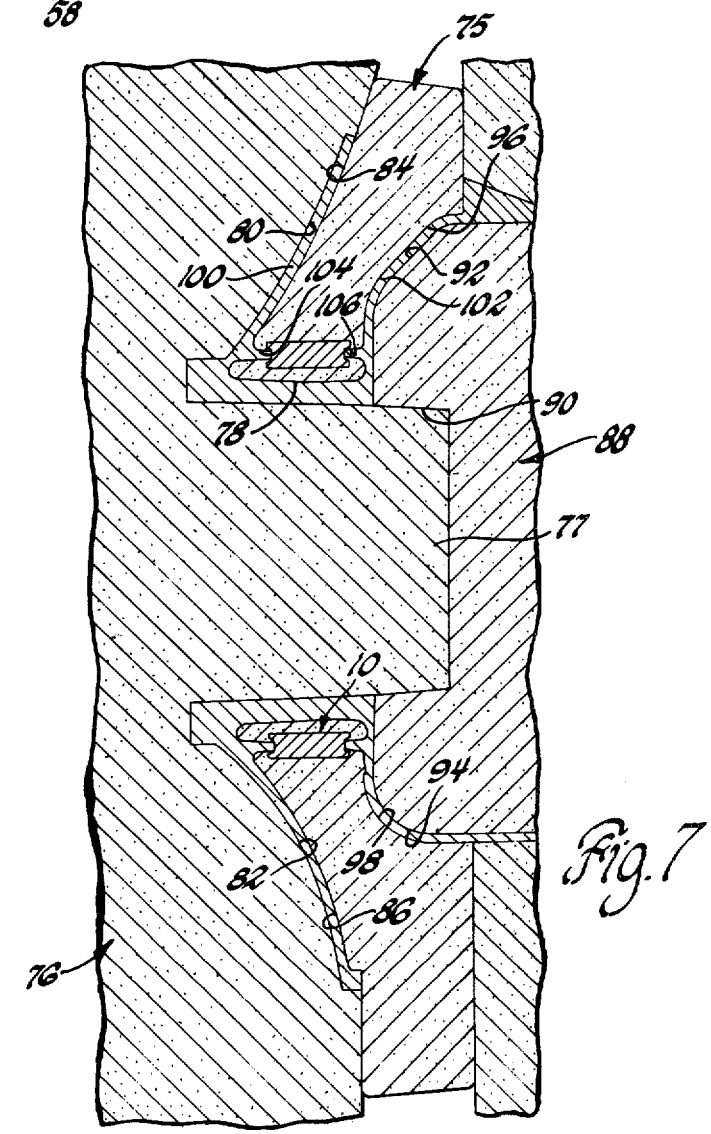
FIG. 7 is a fragmentary view of a cast iron mold box showing the containment ring in a core section in association with other core sections used to cast an integrally formed cast turbine block.

The core 75 is then placed into a mold box which is shown in fragmentary form in FIG. 7 as including a second core 76 having a central post 77 that is held in concentric relationship with a circular inner peripheral surface 78 of the core 75. Additionally, the core 76 has curved surfaces 80, 82 thereon formed in spaced parallellism with core surfaces 84, 86 on core 75 that are formed by the bottom surface 26 of the core box base 23.

Additionally, the mold box includes a third core 88 that includes a central concave opening 90 therein to concentrically locate the post portion 77 of the core 76. The third core 88 includes curved surfaces 92, 94 that are located in spaced parallellism with surfaces 96, 98 formed on the opposite sides of the core 75 and formed by the generally hemispherically configured surface 44 of the cover part 40 of the core box in which the preformed ring 10 is located.

In practicing the invention, molten metal is poured into the mold box to fill annular cavities 100, 102 formed between the mold parts 75, 76 and 88. The molten metal further fills core cavities 104, 106 that are formed by each of the opposed posts 36, 46 respectively. Upon solidification the molten metal defines casting walls 108, 110 each having a plurality of integrally cast posts 112, 114 which are formed in situ of the grooves 16, 18 of the containment ring 10 as best illustrated in FIG. 2.

Figure 1:
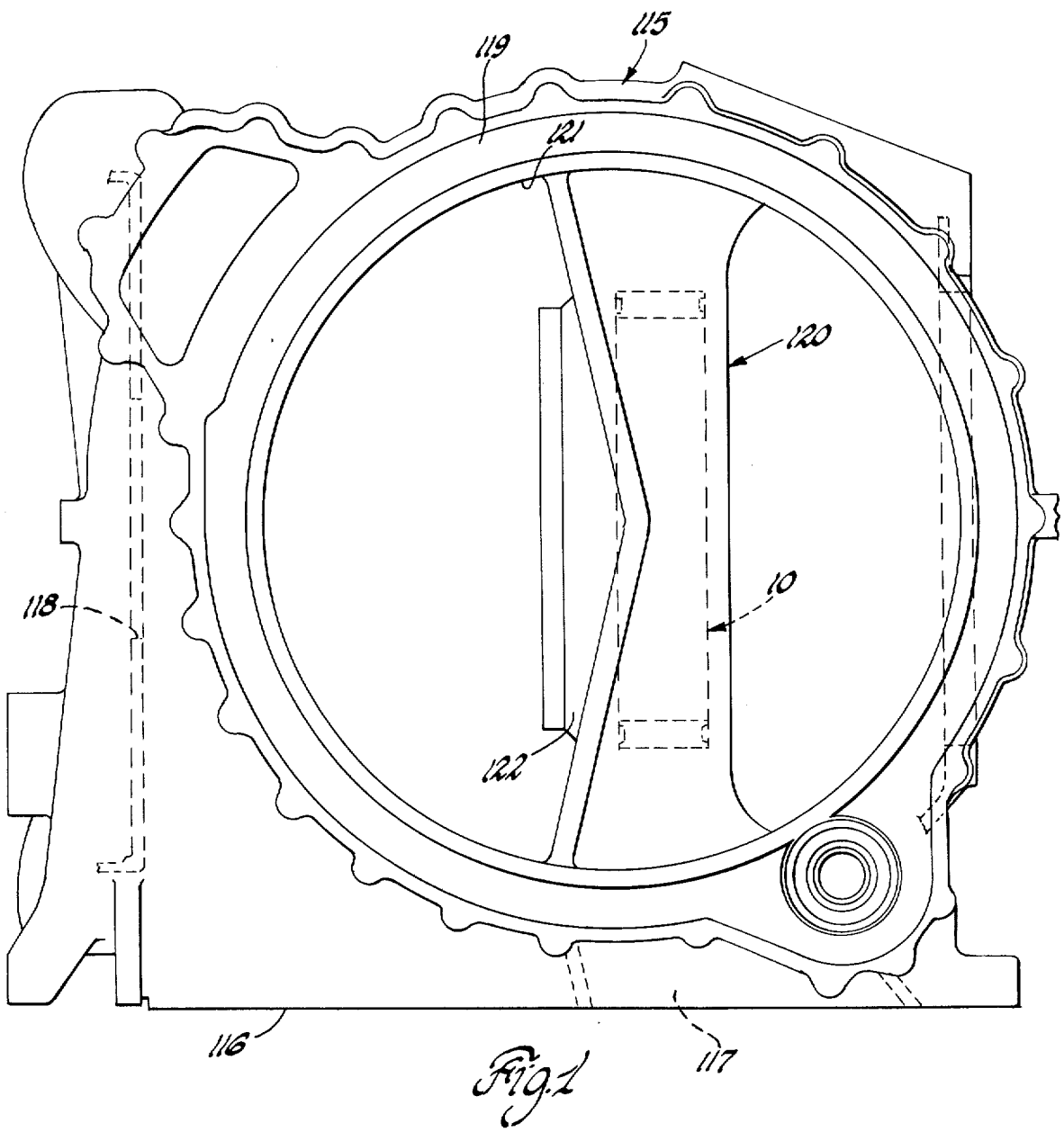
FIG. 1 is a top elevational view of a cast turbine block including the present invention.
Figure 2:
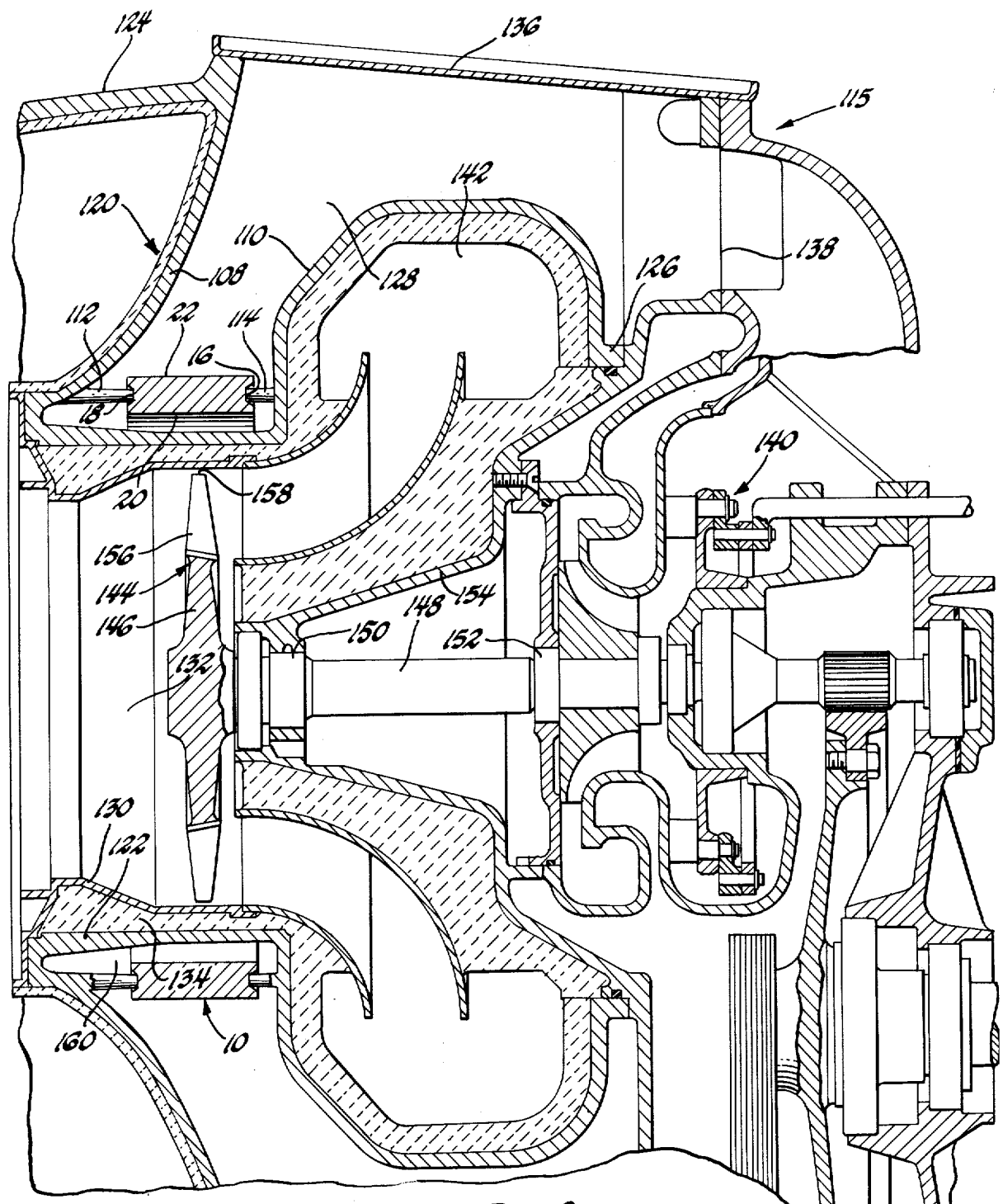
FIG. 2 is a fragmentary vertical view of an exhaust stage of a turbine engine including the integrally formed cast housing and containment ring of the present invention.

The sand cores 75, 76, 88 are shaken out of the cast material and the containment ring 10 is retained in a cast turbine engine block 115 in solid interlocked relationship therewith as best seen in FIGS. 1 and 2.

In FIG. 1 the gas turbine engine block 115 is illustrated as including a burner cover flange 116 on one side thereof adjacent to which is located an exhaust port 117 leading from a cooling air passage to be described. The block further includes a compressor shroud flange 118 on one end thereof and a regenerator flange 119. The ring 10 is retained in an internal passage formed by double walled casting piece 120 that is formed across the inner diameter 121 of the engine block 115. The double walled piece 120 is characterized by having a centrally located internal annular turbine wheel shroud wall portion 122 as best seen in FIG. 2. It is integrally formed with the pair of spaced apart internal walls 108, 110 that are cast in place integrally with a wall 124 of the block and a rear flange 126 thereof respectively to define an air cooling passage 128. Flange 126 defines an open end in block 115 opposite to an open end defined by flange 118. Flange 126 permits installation of turbine components in block 115 and flange 118 permits installation of compressor components in block 115. For an understanding of the present invention compressor components details are unnecessary. A representative showing, however, is set forth in copending United States application Ser. No. 499,480 filed Aug. 22, 1974 to Albert Bell III.

The inner annular wall 122 is formed radially outwardly of a shroud or liner member 130 that defines a centrally located burner exhaust gas passage 132 through the turbine engine. The shroud 130 is spaced radially inwardly of the annular wall 120 to form a space filled by a suitable ceramic insulating material 134.

The air cooling passage 128 has a cover 136 and an inlet 138 in communication with the outlet of an air brake assembly 140 of a type more specifically set forth in the aforesaid application to Albert Bell III which is operative to force cooling air through inlet 138, thence through passage 128 and out port 117.

The passage 128 is formed as an annulus radially outwardly of the turbine block wall 122 and is in communication with the exhaust port 117.

The cooling passage 128 surrounds the exhaust gas passage 132 and a diffuser passage 142 leading to a regenerator of a type well known in the art. For purposes of understanding the present invention the details of the regenerator are not required. The exhaust passage 132 leads across a power turbine stage 144 therein having a wheel 146 connected to a power shaft 148 supported by spaced apart bearings 150, 152 on opposite ends of the shaft 148 on a bearing housing 154 that is secured to the flange 126 to the outboard end of the turbine engine block 115. The wheel 146 includes a ring of blades 156 thereon each having a tipped portion 158 located in close radial spaced relationship with a segment of the shroud 130 that is immediately radially inwardly of the annular wall 122.

One feature of the present invention is that the ring 10 is cast in place and retained so that the inside diameter 20 thereof will be spaced radially outwardly of the outer surface of the wall 120. This defines an annular cooling space 160 on the inside of the ring 10 through which air is circulated from the passage 128 between each of the circumferentially spaced cast in situ posts 112, 114 to produce a circulation of cooling air completely around the ring 10. The ring is thus maintained in a relative cool environment. Accordingly the ring 10 can be prefabricated from a lower cost material having adequate strength characteristic under such reduced temperature operating characteristics to assure containment of the high speed turbine wheel 144.

The provision of cast in situ posts to retain the ring 10 in its radially outward spaced relationship to both the inner wall 120 and the wheel 144 eliminates the need for separate fasteners to secure the ring with respect to the cast walls of the turbine engine block. Additionally the configuration eliminates the need for machining wall segments of the block in order to secure a containment ring therein by previously practiced pressed fit process steps.

An additional feature is that the containment ring 10 is included in the casting at the first step of the process by being formed integrally in a core portion thereof. It is thereafter handled in the aforedescribed process as an integral part of the core to eventually assume a desired geometric relationship with operative components of a turbine without the need for special control of reference surfaces or locating devices to produce final placement of the ring in the turbine block.

In one embodiment gray cast iron was used for the cast block 115 with a nominal composition as follows:

| ELEMENTS, WEIGHT, PERCENT | | | | | | |
|---|---|---|---|---|---|---|
| C | Mn | P | S | Si | Cr | Fe |
| 3.25 | 0.60 | 0.15 | 0.15 | 2.25 | 0.30 | Balance |

The containment ring 10 was made of Inconel 601 with the following composition:

| ELEMENTS, WEIGHT, PERCENT | | | | | | |
|---|---|---|---|---|---|---|
| Ni | Cr | Al | Fe | Si | C | Mn |
| 60.7 | 23.0 | 1.35 | 14.1 | 0.25 | 0.05 | 0.50 |

Due to reduced temperatures in passage 128 lower cost materials such as Inconel 706 or stainless steel of the AISI type 300 series could be used in the containment ring 10.

While the embodiments of the present invention, as herein disclosed, constitute a preferred form, it is to be understood that other forms might be adopted.

What is claimed is:

1. In a gas turbine engine, a cast iron block having a central bore therethrough including an annular turbine shroud wall, means including a liner defining a burner exhaust gas passage, radially inwardly of said shroud wall, a turbine wheel having a plurality of blades directed radially outwardly of said wheel, each of said blades including a tip portion thereon located in closed spaced relationship to said liner, means for supporting said wheel for high speed rotation relative to said shroud, said block having spaced apart internal wall portions located radially outwardly of said shroud defining an air cooling passage formed in surrounding circumferential relationship to said shroud, a plurality of integral cast iron pins formed on said spaced apart internal wall portions, pins on one of said spaced apart wall portions defining a circular pattern thereon, pins on the opposite internal wall forming a second circular pattern thereon, a metal containment ring located in said cooling passage radially outwardly of said shroud having an inside diameter in spaced relationship to said casting shroud wall to form a circumferential cooling space radially inwardly of each of said first and second circular pattern of pins, said metal containment ring including a pair of side walls thereon each having a continuous circumferential groove formed therearound, each of said posts on said walls having the tip portions thereof formed in situ in one of said grooves to rigidly locate said metal containment ring in said cooling passage in radially spaced surrounding relationship to said turbine wheel.

2. In a gas turbine engine, the combination of a cast iron housing having a pair of open ends thereon and a centrally located annular housing portion arranged colinearly of said pair of open ends, means including an annular shroud located radially inwardly of said annular housing portion defining a burner exhaust passage through the interior of said cast iron housing, means including a ring of turbine blades located within said exhaust passage radially inwardly of said annular shroud for operating at a high speed in response to flow through said burner exhaust gas passage, said cast iron housing including spaced apart interior wall portions located radially outwardly of said annular housing portion to define an open air cooling passage in surrounding relationship to said inner annular portion, means for directing cooling air through said passage, a metal containment ring located within said air cooling passage radially outwardly of said inner annular housing portion, said ring including side walls thereon located in spaced relationship to said spaced apart interior wall portions of said housing, said ring being formed continuously circumferentially around said annular housing portion with the inside diameter of said ring being in spaced relationship to said annular portion, an annular groove formed in each of said ring side walls continuously around said ring, a first plurality of integrally formed retaining posts on one of said interior wall portions, each post being directed outwardly into said cooling passage and having portions thereon formed in situ within one of said grooves, a second plurality of posts formed integrally on the other of said interior wall portions, each of said second plurality of posts being directed into said cooling passage to have the tip thereof secured in situ within the other of said grooves thereby to retain said ring rigidly with respect to said cast housing, said posts having passages formed therebetween wherein cooling air directed through said cooling passage flows completely around said ring and against the outer surface of said inner annular portion for cooling said exhaust gas shroud and said ring during operation of the turbine engine.

* * * * *